United States Patent [19]
McDowell

[11] 4,402,617
[45] Sep. 6, 1983

[54] THIN WALL SINTERED BUSHING FOR A ROCK BIT

[75] Inventor: Kenneth O. McDowell, De Soto, Tex.

[73] Assignee: Dresser Industries, Inc., Dallas, Tex.

[21] Appl. No.: 262,731

[22] Filed: May 12, 1981

[51] Int. Cl.³ .............................................. F16C 33/12
[52] U.S. Cl. ..................................................... 384/95
[58] Field of Search ................... 308/8.2, 239, 237 R, 308/237 A; 175/371, 372; 384/92, 95, 282, 295

[56] References Cited
U.S. PATENT DOCUMENTS 4,207,658  6/1980  Sorenson ............................ 308/8.2
4,260,203  4/1981  Garner ................................ 308/8.2
4,320,931  3/1982  Shaffer ........................... 308/237 R

*Primary Examiner*—Lenard A. Footland
*Attorney, Agent, or Firm*—Fred A. Winans

[57] ABSTRACT

A rotary rock bit having a relatively thin-walled porous journal bushing, infiltrated with an anti-galling metal, is shown. The bushing is mounted within the rolling cone cutter and retained axially by abutments and rotationally by an interference fit in conjunction with a metallic conformal layer at the interferingly engaging surfaces to prevent movement of the bushing with respect to the cutter under bit operating conditions.

8 Claims, 3 Drawing Figures

THIN WALL SINTERED BUSHING FOR A ROCK BIT

BACKGROUND OF THE INVENTION

1. Field of the Invention

This invention relates to a rock bit having a sintered bushing such as disclosed in U.S. Pat. No. 4,207,658 of common assignee with the present invention and, more particularly, to a rock bit having such a bushing with a relatively thin wall.

2. Description of the Prior Art

As disclosed in the above-identified patent, the sintered bushing of the rock bit comprises an alloy powder compressed into the desired shape providing a porous matrix and then sintered to provide an integral, porous bushing. The pores are infiltrated with an anti-galling material to provide a relatively long-lasting rock bit bearing. A preferred anti-galling material is a silver alloy which, because of its silver content, is relatively expensive. It has thus been determined that a substantial savings could be realized if a thin-walled bushing, having the porous matrix with the silver alloy anti-galling material infiltrated therein, could be substituted for the relatively thick-walled bushing presently available.

As presently fabricated, the thick-walled porous bushing for a rock bit has a wall thickness of approximately 0.180 inches providing the bearing with substantial rigidity. Such bushing is pressed into a mating opening in the cutter cone having a slightly smaller diameter to provide an interference fit therebetween. With this interference, the bushing is stationarily retained in the cone.

In a thin-walled bushing, under the dynamic loading to which such bushing is subjected when the bit is drilling, there is sufficient deformation in the wall that the bearing tends to "walk out" (i.e. move axially outwardly) and also to rotate or turn with respect to the cutter cone or adjacent backing ring. Further, it is believed that any greater interference will cause buckling in the thin wall. Thus, the relative movement of the bushing cannot be prevented by merely increasing the interference fit. (For the most part the thin-walled bushing has a wall thickness of 0.045 inches, however, wall thicknesses up to 0.125 inches still encounter the above problems.) Therefore, to retain the thin-walled bushing stationarily seated within either a backing ring or directly within a mating opening in the rolling cutter requires an interference fit, within the acceptable range, in addition to other structure which assists in maintaining the thin-walled bushing stationary in the cutter.

SUMMARY OF THE PRESENT INVENTION

The present invention provides a thin-walled bushing stationarily mounted either directly within the rolling cone cutter, or within a backing ring which has sufficient thickness to be mounted within the cutter with an interference fit to prevent rotation between the cutter and the backing ring. A retaining lip on the backing ring or a snap-in retaining ring in the cutter abuts the axially outer face of the bushing to prevent its outward axial movement. However, to prevent relative rotational movement of the bushing with respect to the cutter, a conformal coating of metal (i.e. a softer, more maleable metal than the cutter, the backing ring and the bushing) is plated or deposited on at least one of the mating stationary faces engaging the bushing (the i.d. of the cutter or the i.d. of the backing ring). This metal coating tends to fill the irregular surface, caused by machining the facing engaging surfaces, to decrease surface asperities that, under some initial relative rotation, tend to wear down sufficiently to permit continued relative rotation of the bushing. The conformal coating, in addition limits any decrease of the surface engagement between the two mating surfaces thereby minimizing the relative rotation which should only last until the surfaces work themselves into a stationary engaging mating position.

In addition to assisting in eliminating the relative roatation of the thin-walled bushing, the conformal coating, in filling the valleys between asperities, promotes intimate surface contact between the bushing and its backing material (i.e. the cutter or a backing ring) for efficient heat conductivity throughout the entire engaging surfaces for greater heat dissipation from the bushing into the backing ring or cutter thereby maintaining the bushing relatively free from hot spots, that could otherwise cause premature failure due to localized warpage or adhesion between the bearing pin and the bushing.

DESCRIPTION OF THE PREFERRED EMBODIMENT

Figure 1:
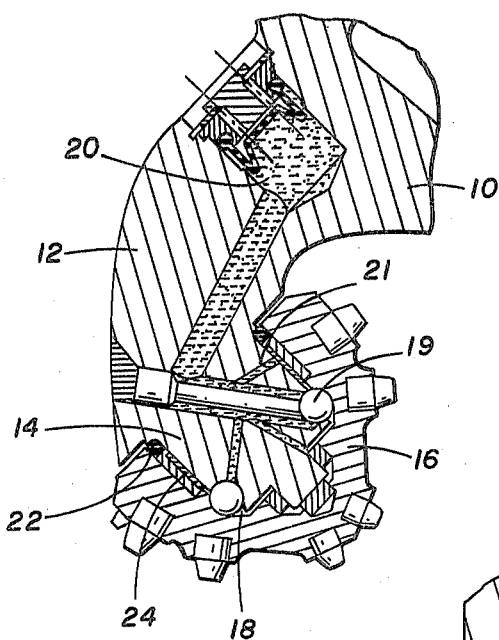
FIG. 1 is a cross-sectional elevational view through the bearing structure of the rock bit arm and rolling cone cutter assembly.

Referring to FIG. 1, a portion of a rotary rock bit is shown. As is known, such a rock bit typically includes a downwardly extending arm 12 terminating in an inwardly, downwardly extending bearing pin 14 having an outer generally stepped cylindrical configuration for rotatably mounting a conical cutter member 16 thereon. As therein seen, the cutter member 16 has an internal cavity 18 of similar stepped cylindrical configuration with spherical bearings 19 captured in mating raceways therebetween to retain the cutter member 16 on the bearing pin 14 in a well known manner.

Also as is known, a sealed lubrication system 20 distributes lubricant to the various bearing areas between the cutter member and bearing pin as through passages 21. An annular seal ring 22 at the mouth of the cone cavity maintains the mating bearing areas sealed from the external drilling environment.

Still referring to FIG. 1, it is seen that a journal bushing element 24 is secured to the rolling cutter within the cavity 18 adjacent the initial axial position of the cavity, which also corresponds to the largest internal diameter of the cavity, for rotation with the cutter. The bushing provides a relatively rotating surface bearing against the largest outer diameter portion of the bearing pin 14. As previously mentioned, it is known to fabricate such a bushing from a compressed powdered alloy which is sintered to provide a porous integral structure and infiltrate the pores thereof with an anti-galling substance such as a silver alloy. Thus, the journal engagement between the pin and the relatively rotating cutter, at least at this portion of the pin, is provided by the bushing 24 having an anti-galling alloy to promote a long-life bushing as aided by the lubricant from the lubrication system.

In the sealed rock bit of the corporate assignee of the present invention, it has been common practice to provide an annular seal ring 22 at the mouth of the cone cavity to seal the cavity from external debris. An optimal squeeze is placed on the ring, due to the cross-section of the ring being larger than the radial separation between the adjacent pin 14 and internal cone surfaces on which the seal is seated, to accommodate wear and still maintain an effective sealing engagement over the life of the bit. In this regard, a radial dimension has been established between the pin 14 and the cutter cavity 18 at the mouth thereof which, for the purpose of minimizing machining of the cavity, has been maintained through the bushing area of the cutter. Thus, the wall thickness of the prior art bushing has been sufficient to conform and fill such radial dimension. This has provided a relatively thick wall bushing having sufficient wall strength to accept an interference fit between the bushing outside diameter and the cutter cavity inside diameter that prevents the bushing from movement relative to the cutter under dynamic loading of the bit and yet does not induce any buckling or deformity in the bushing surface. However, as previously explained, such thick wall construction (i.e. a wall thickness on the order or 0.180 inches) resulted in excessive expense in infiltrating the pores thereof with the silver alloy.

Figure 2:
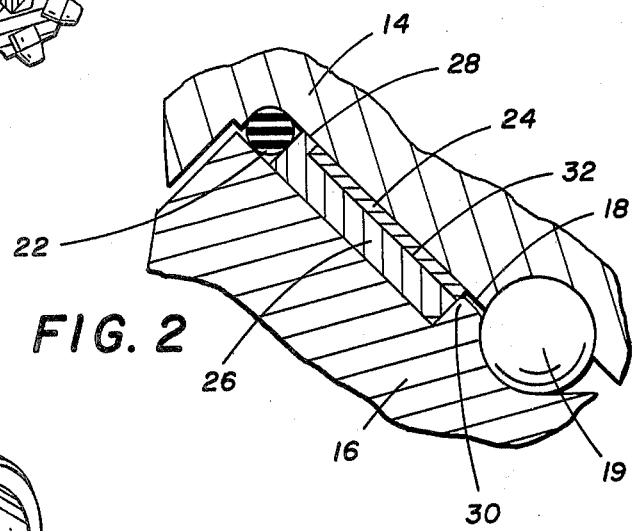
FIG. 2 is an enlarged cross-sectional view of the journal bushing in accordance with the present invention.

In order to reduce the amount of silver alloy required to infiltrate the bushing, the wall thickness of the bushing has been reduced (i.e. to approximately one-quarter the original dimension or on the order of 0.045 inches). This is more clearly illustrated in FIG. 2 wherein it is seen that the bushing 24 is stationarily seated within a backing ring 26 which has a wall thickness sufficient to provide backing from the cavity wall to the bushing and thus being on the order of approximately 0.135 inches. As therein seen, the backing ring 26 has an annular lip 28 adjacent the axial outer end thereof. The bushing 24 is disposed within the backing ring and abutting the lip on one end and terminating in line with the opposite end of the backing ring wherein both the ring and the bushing abut a shoulder 30 formed by the stepped internal configuration of the cutter cavity. This abutment axially fixes the position of the bushing to retain it from any axial movement.

It is to be understood that the outer diameter of the backing ring 26 is sufficiently larger than the mating internal diameter of the cutter cavity so that there is an interference fit which, because of the rigidity of the backing ring 26, can be made sufficient to prevent the ring 26 from turning in the cone under the dynamic loads experienced when the bit is drilling. Also, it is further understood that the outer diameter of the bushing 24 is likewise greater than the i.d. of the backing ring 26 for a like interference fit. However, due to the relatively thin wall of the bushing 24, under dynamic loads, the flexibility of the bushing, although limited, would be sufficient to permit relative rotation between the bushing and the backing ring even with such interference fit. As previously explained, such rotation cannot be overcome merely by increasing the interference fit because it may induce buckling in the bushing. Thus, at least one of the facing engaging surfaces (i.e. either the o.d. surface of the bushing of the i.d. surface of the backing ring) is coated, such as at 32, with a conformal metal such as a nickel or nickel alloy.

The conformal coating 32 is preferably applied after the surface has been machined to the proper diameter. This coating, although generally conforming to the texture of the machined surface to which it is applied, tends to fill the grooves, thereby reducing the asperities in the surface. The coating 32 thus provides a smoother surface, providing more area contact with the mating interfering surface, that otherwise could be mating primarily at facing asperities, providing greater area engagement between these two surfaces. Further, if the dynamic loading of the bit causes some initial relative rotation between the bushing 24 and the backing ring 26, the conformal metal coating 32 will cause the surfaces to wear into an engaging arrangement with the coating 32, instead of being worn away by the relative motion, merely displaced to other areas until the interfering surfaces are seated together in an engaging condition. In this manner rotative motion of the bushing relative to the cone is preferably eliminated except for occasional incidental re-seating type movement.

Although the conformal coating in one tested embodiment of the invention was a nickel alloy, it is expected that other metal coatings such as copper, tin, zinc, cadmium, aluminum or lead and alloys thereof could also be effectively used.

Figure 3:
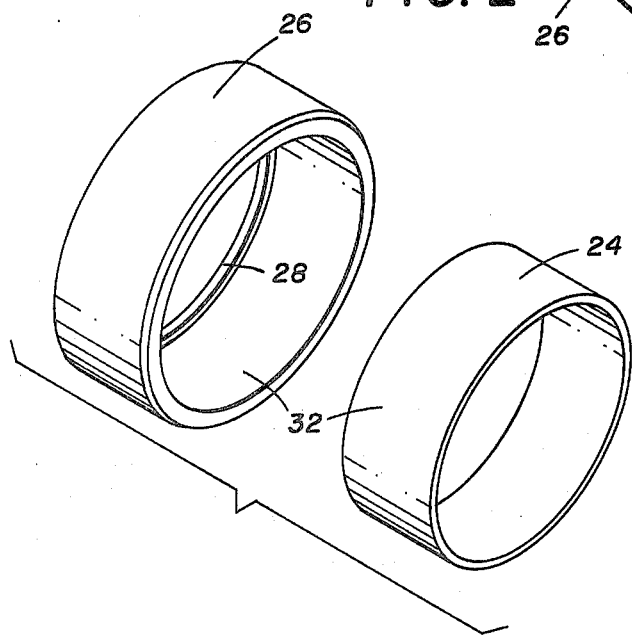
FIG. 3 is an exploded isometric of a thin wall journal bushing and backing ring sub-assembly according to the present invention.

Reference is now made to FIG. 3 to show the i.d. surface of the backing ring 28 which is primarily the surface which is coated with the conformal metal layer; however, it is evident that the outer diameter surface of the bushing 24 could also be coated or both surfaces could be coated.

An added advantage of the conformal layer 32, in providing more surface engagement between the bushing 24 and the backing ring 26, is that by providing this greater surface contact it aids in conducting heat from the bushing 24 and into the backing ring 26 and ultimately into the cutter 16. This decreases the chance that hot spots will develop in the bushing 24 that could cause localized stress which may lead to premature bearing failure.

Thus, a reduced thickness infiltrated porous bushing is stationarily mounted in the rolling cone cutter in a manner that does not cause buckling yet anchors the bushing against turning and which further aids in heat dissipation from the bearing area.

I claim:

1. An improved rotary rock bit having a rolling cone cutter with structure defining a bearing cavity, mounted on a stationary bearing pin extending from an arm of said cutter, wherein said improvement comprises:
   a backing ring member disposed within said cone cavity in an interference fit;
   a journal bushing member generally stationarily mounted in said backing ring member in an interference fit and rotationally bearing on said pin; positive abutment means extending radially on axially opposite sides of said bushing member for retaining said bashing member against axial movement under dynamic loading of said pin and cutter; and,
   a conformal layer of metal between the radially outer axially extending surface of said bushing and the inner facing engaging surface of said backing ring member; and, wherein said interference fit in conjunction with said conformal layer, resists rotation of said bushing within said backing ring under dynamic loading of said pin and cutter whereby said bushing is substantially stationarily retained in said backing ring during operation of said bit.

2. Structure according to claim 1 wherein said backing ring member includes; a lip extending radially toward said pin to define one of said positive abutment means; and, said cutter bearing cavity defines a radially extending annular shoulder to define another positive abutment means.

3. Structure according to claim 2 wherein said conformal layer is applied to the internal surface of said backing ring.

4. Structure according to claim 3 wherein said conformal metal layer is a coating of metal from a group comprising nickel, copper, tin, zinc, cadmium, aluminum and lead or alloys thereof.

5. Structure according to claim 2 wherein said wall thickness of said backing ring is substantially thicker than the wall thickness of said bushing.

6. Structure according to claim 5 wherein said ring wall thickness is on the order of three times the wall thickness of said bushing.

7. An improved rotary rock bit having a rolling cone cutter having structure defining a bearing cavity, mounted on a stationary bearing pin extending from an arm of said cutter, a porous journal bushing member infiltrated with anti-galling material generally stationarily mounted on said cavity structure and rotationally bearing on said pin, and an elastomeric seal ring sealingly engaging the pin in said cavity structure to seal said cavity structure and bushing from the bit environment, wherein the improvement comprises:

said cavity structure defining axially extending positive abutment means on opposite sides of said bushing for retaining said bushing against axial movement under dynamic loading of said pin and cone; and a conformal layer of metal interposed between the outer axially extending surface of the bushing and the inner facing engaging surface of said bearing cavity structure; and wherein said outer and inner engaging surfaces have a first interference fit which in conjunction with said conformal layer resists rotation of said bushing under dynamic loading of said pin and cutter whereby said bushing is stationarily retained in said cavity structure during operation of said bit.

8. Structure according to claim 7 wherein:

said bearing cavity structure includes a separate backing ring member mounted within said cutter adjacent said seal and having a face providing a seal gland, said backing ring stationarily seated within said cutter in a second interference fit and defining a lip extending radially toward said pin to define one of said abutment means; and wherein said bushing is disposed within said backing ring with said first interference fit and said conformal layer of metal interposed between the respective axially extending engaging surfaces of said ring and bushing.

* * * * *